US008488461B2

(12) United States Patent
Pan et al.

(10) Patent No.: US 8,488,461 B2
(45) Date of Patent: Jul. 16, 2013

(54) ADAPTIVE SCHEDULING OF DATA TRANSFER IN P2P APPLICATIONS OVER ASYMMETRIC NETWORKS

(75) Inventors: Yuan Pan, Guangdong (CN); Yiu Bun Lee, Kowloon (CN)

(73) Assignee: The Chinese University of Hong Kong, Hong Kong (CN)

( * ) Notice: Subject to any disclaimer, the term of this patent is extended or adjusted under 35 U.S.C. 154(b) by 199 days.

(21) Appl. No.: 13/106,824

(22) Filed: May 12, 2011

(65) Prior Publication Data

US 2013/0142038 A1    Jun. 6, 2013

Related U.S. Application Data

(60) Provisional application No. 61/333,985, filed on May 12, 2010.

(51) Int. Cl.
*H04J 3/22* (2006.01)

(52) U.S. Cl.
USPC .......................................... 370/232; 370/468

(58) Field of Classification Search
USPC ................. 370/229–232, 241, 252, 328–330, 370/468
See application file for complete search history.

(56) References Cited

U.S. PATENT DOCUMENTS

| 2005/0262266 | A1* | 11/2005 | Wiberg et al. | 709/238 |
| 2007/0008884 | A1* | 1/2007 | Tang | 370/230 |
| 2010/0039938 | A1* | 2/2010 | Sagfors | 370/238 |

OTHER PUBLICATIONS

"ADSL overview", Wowarea, 2006, retrieved from the Internet at http://www.wowarea.com/dyn/vge.php/g_1/k_1/o_0 on Mar. 29, 2013, 2 pages.
"Azureus FAQ", VuzeWiki, Nov. 2011, retrieved from the Internet at http://wiki.vuze.com/w/Azureus_FAQ on Mar. 29, 2013, 4 pages.
"HiNet ADSL Broadband Packages". retrieved from the Internet at http://promotion.hinet.net/pet/product_adsl.do on Mar. 29, 2013, 2 pages.
Afifi, H., et al., "A dynamic delayed acknowledgment mechanism to improve TCP performance for asymmetric links", In *Computers and Communications, 1998, ISCC'98. Proceedings, Third IEEE Symposium on*, IEEE, 1998, 5 pages.
Al-Khatib, W., et al., "A new approach to improve TCP performance over asymmetric networks", *Electronics and Electrical Engineering*, No. 7(71), pp. 13-18, 2006.
Balakrishnan, H., et al., "The effects of asymmetry on TCP performance", in *Proceedings of the 3rd annual ACM/IEEE international conference on Mobile computing and networking*, pp. 77-89, ACM, Sep. 1997.

(Continued)

*Primary Examiner* — Kerri Rose
(74) *Attorney, Agent, or Firm* — Kilpatrick Townsend & Stockton LLP; Kenneth R. Allen (57) ABSTRACT

In a peer-to-peer asymmetric communication environment, an adaptive upload Data Rate Control element—called Adaptive-DRC—is used to detect increase in data return-trip time (RTT) caused by the congestion associated with the uploading of data in an uplink which in turn impacts on downloading data on an associated downlink, namely a downlink sharing resources with the uplink. Using Adaptive-DRC, the congestion is detected and thereupon adjustments to are made to allow continued communication. Adaptive-DRC comprises: (i) RTT estimation; (ii) detection of the onset of congestion, herein pre-congestion detection; and (iii) adaptation of the upload data rate limit. Two specific embodiments are contemplated, namely two versions of Adaptive-DRC wherein the difference lies in the upload data rate limit adaptation technique.

13 Claims, 9 Drawing Sheets

OTHER PUBLICATIONS

Carson, M., et al., "NIST Net—A Linux-based Network Emulation Tool", *ACM SIGCOMM Computer Communication Review*, vol. 33, No. 3, Jul. 2003, pp. 111-126.

Elloumi, O., et al., "Improving congestion avoidance algorithms for asymmetric networks", In *Communications, 1997, ICC 97 Montreal, 'Towards the Knowledge Millennium', 1997 IEEE International Conference on*, vol. 3, pp. 1417-1421, IEEE, 1997.

Fu, C., et al., "Performance degradation of TCP Vegas in asymmetric networks and its remedies", In *Communications, 2001, ICC 2001, IEEE International Conference on*, vol. 10, pp. 3229-3236, IEEE, 2001.

Jacobson, V., et al., "TCP extensions for high performance", May 1992, 37 pages.

Lamping, U., et al., "Wireshark User's Guide". retrieved from the Internet at http://www.wireshark.org/docs/wsug_html_chunked/index.html on Mar. 29, 2013, 11 pages. (Table of contents only).

Louati, F., et al., "Handling two-way TCP traffic in asymmetric networks", In *High Speed Networks and Multimedia Communications*, Springer Berlin Heidelberg, 2004, 11 pages.

Mathis, M., et al., "The macroscopic behavior of the TCP congestion avoidance algorithm", *ACM SIGCOMM Computer Communication Review*, vol. 27, No. 3, 1997, 16 pages.

Mendenhall, W., et al., *A Brief Introduction to Probability and Statistics*, Duxbury/Thomson Learning, 2002, 8 pages. (Table of contents only).

Padhye, J. et al., "Modeling TCP throughput: a simple model and its empirical validation", In *ACM SIGCOMM Computer Communication Review*, vol. 28, No. 4, ACM, 1998, 23 pages.

Pan, Y., et al., "Adaptive scheduling of data transfer in P2P applications over asymmetric networks", In *Communications (ICC), 2010 IEEE International Conference on*, IEEE, 2010, 5 pages.

\* cited by examiner

ADAPTIVE SCHEDULING OF DATA TRANSFER IN P2P APPLICATIONS OVER ASYMMETRIC NETWORKS

CROSS-REFERENCES TO RELATED APPLICATIONS

The present application claims benefit under 35 USC 119(e) of U.S. provisional Application No. 61/333,985, filed on May 12, 2010, entitled "Adaptive Scheduling Of Data Transfer In P2P Applications Over Asymmetric Networks," the content of which is incorporated herein by reference in its entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to peer-to-peer applications using asymmetric communication networks.

The success of peer-to-peer (P2P) applications hinges on users' willingness to contribute unused storage and network bandwidth to serve other peers. While broadband residential networks have become commonplace in many countries, many of them offer broad bandwidth only in the downlink, i.e., from ISP to user host. By contrast, the uplink bandwidth is typically significantly lower, ranging from tens to hundreds of Kbps as compared to a downlink's multi-Mbps bandwidth. This is particularly common in residential networks built on ADSL and xDSL technologies [1]. (Reference numerals refer to documents listed below.)

While this type of bandwidth-asymmetric network does not preclude the use of P2P applications, it nonetheless creates a new problem for such applications when the data are transported over TCP. Specifically, in P2P applications such as BitTorrent (from BitTorrent, Inc. of San Francisco, Calif.), many users have observed that if the upload data rate is too high, e.g., close to the uplink bandwidth limit, then the achievable download data rate will be severely degraded.

Figure 1:
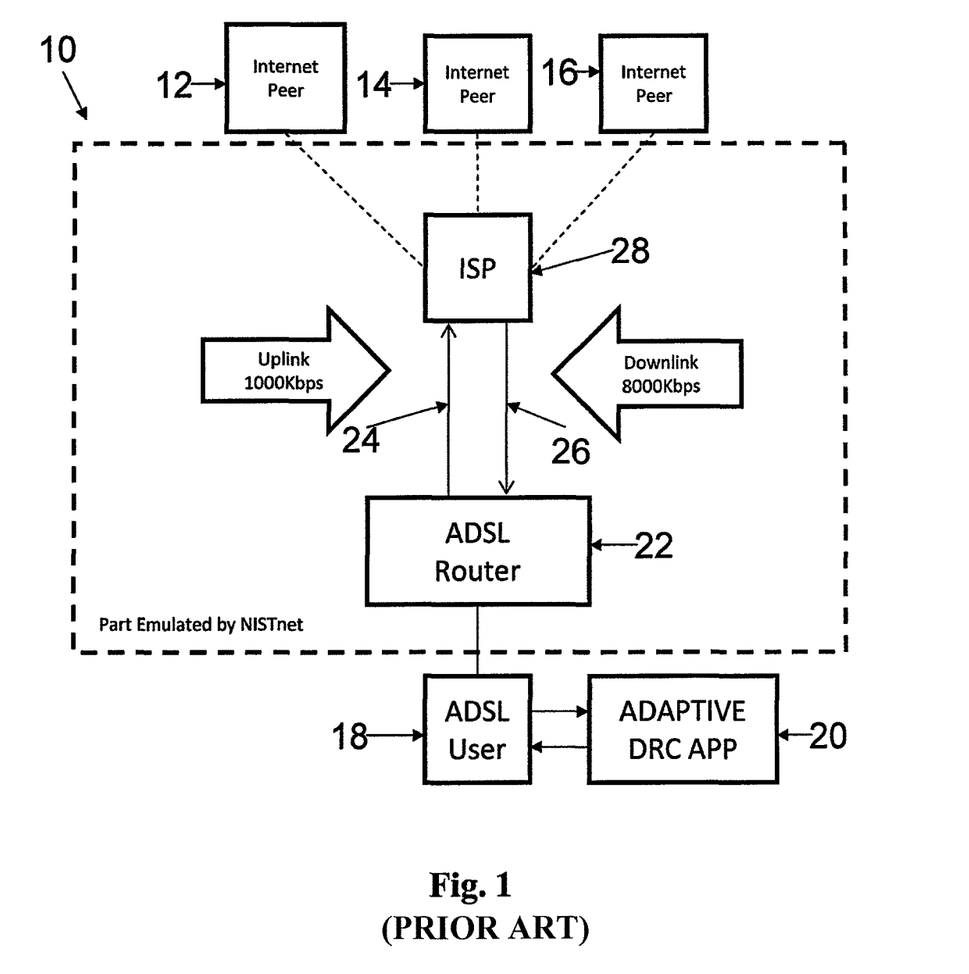
FIG. 1 is a block diagram of a bandwidth-asymmetric network in which the invention can be embedded.
Figure 2:
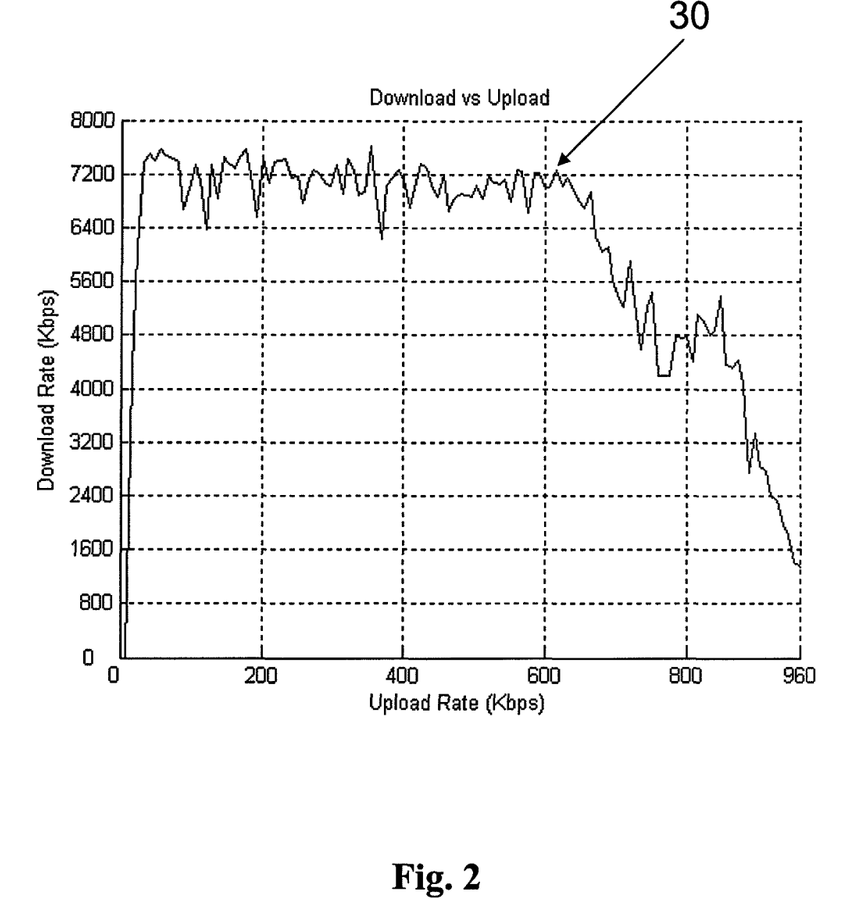
FIG. 2 is a graph showing impact of upload data rate on download data rate in an asymmetric network of FIG. 1.

To illustrate this problem an experiment as depicted in FIG. 1 (without the inventive element shown therein) was conducted and the achievable download data rate versus upload data rate for a P2P software called Azureus [2] was plotted. (Azureus is an implementation of BitTorrent.) This software allows the user to configure the maximum upload data rate and through this feature, impact on the download data rate is seen in FIG. 2, where download data rate was drastically reduced from around 900 Kbps to less than 200 Kbps when the upload data rate limit was increased beyond 120 Kbps (close to the 125 Kbps uplink bandwidth limit).

To remedy this problem, many P2P applications (e.g., Azureus, utorrent, BitTorrent, etc.) allow the users to manually configure the upload data rate limit so that a reasonable upload data rate can be used (or else P2P will not work) while keeping the download data rate to fully-utilize the broadband network downlink. Clearly this ad hoc feature is not very user-friendly nor can it adapt to the underlying network properties automatically. A more practical approach is needed.

Literature Review

Bandwidth-asymmetric broadband networks have existed for decades. Therefore numerous researchers had developed solutions to tackle performance problems in such networks. More recent works tackled the problem in the context of having competing traffic in the uplink. Three categories are considered, namely, network layer approaches, transport layer approaches, and application layer approaches.

Network Layer Approaches

An effective network layer approach is to implement priority queuing in the network device connected to the uplink. The principle is to schedule packets from the receiver based on their packet type and gives higher priority to ACK packets [3, 4, 5]. Thus even under heavy uplink data traffic ACK packets will still not be affected.

Transport Layer Approaches

Transport layer approaches rely on modification to the transport protocol of the sender, the receiver, or both. The principle is to enable the sender transport to distinguish downlink congestion from uplink congestion, and only react to the former during congestion control [6, 7, 8]. Specifically, since TCP uses RTT (return trip time) to provide congestion control, both uplink congestion and downlink congestion will affect the sending rate which is undesirable. If the transport can separate RTT into FTT (forward trip time) and BTT (backward trip time), then it will be able to react to downlink congestion only and become immune to uplink congestion. This can be accomplished using the TCP timestamp extension described in RFC1323 [9].

Application Layer Approaches

An application layer approach refers to those solutions which can be implemented entirely within an application without modification to the lower layers such as the transport protocol, the network protocol and network devices. Only one known attempt has been found, namely, in the form of an implementation called Auto-Speed, as in the Azureus [2] P2P client software. The Auto-Speed module in Azureus was not well-documented. However, it is configured so as to control upload data rate limit by monitoring the RTT to a Google host. An adaptive algorithm is then used to increase and decrease the limit based on variations in the continuously measured RTT.

Figure 3:
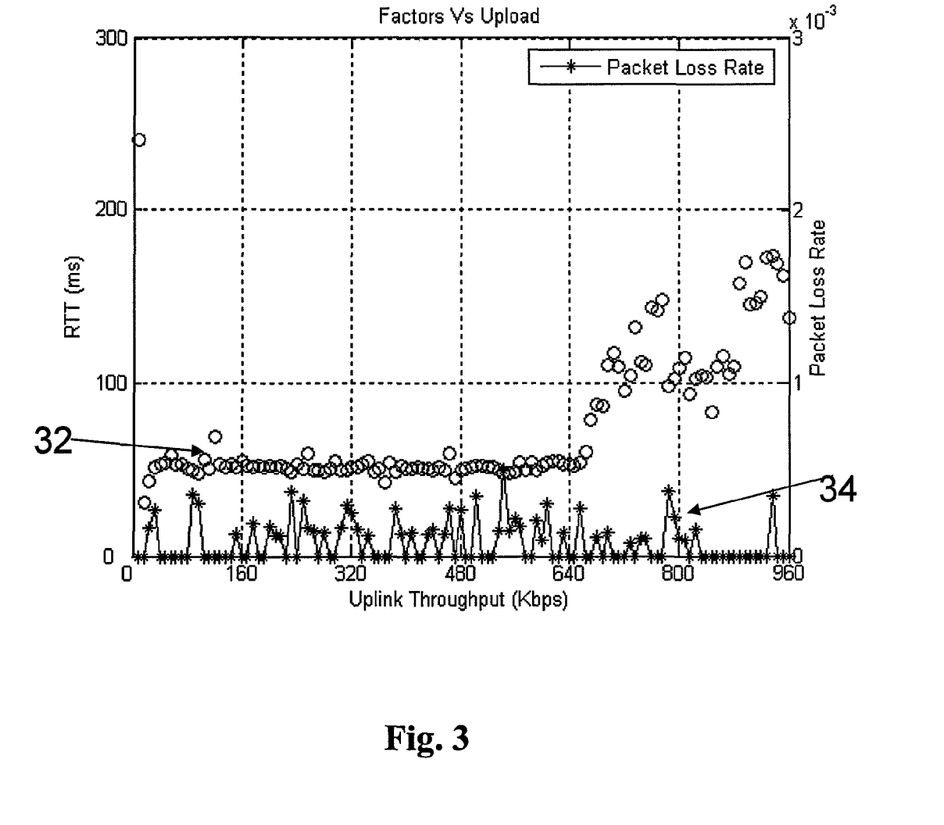
FIG. 3 is a graph showing results of experimental measurements at an ADSL user of download throughput, upload throughput, RTT, and packet loss.

It has been established that TCP throughput performance primarily depends on the path RTT and the packet loss rate [11-12]. Experiments measured the following at the ADSL user: download throughput, upload throughput, RTT, and packet loss. The results are summarized in FIG. 3. The results clearly show that RTT 32 increases consistently with higher upload throughput as congestion built up. By contrast, the packet loss rate 34 remains at a low level even at high upload data rates. Contrasting this with the download throughput in FIG. 2 reveals that the download throughput degradation beginning at the upload data rate of 640 Kbps is in fact primarily due to the increased RTT 32. The implication of this observation is RTT can be used as an indicator of uplink congestion so that the system can react by controlling the upload data rate limit to prevent congestion from occurring.

Figure 4:
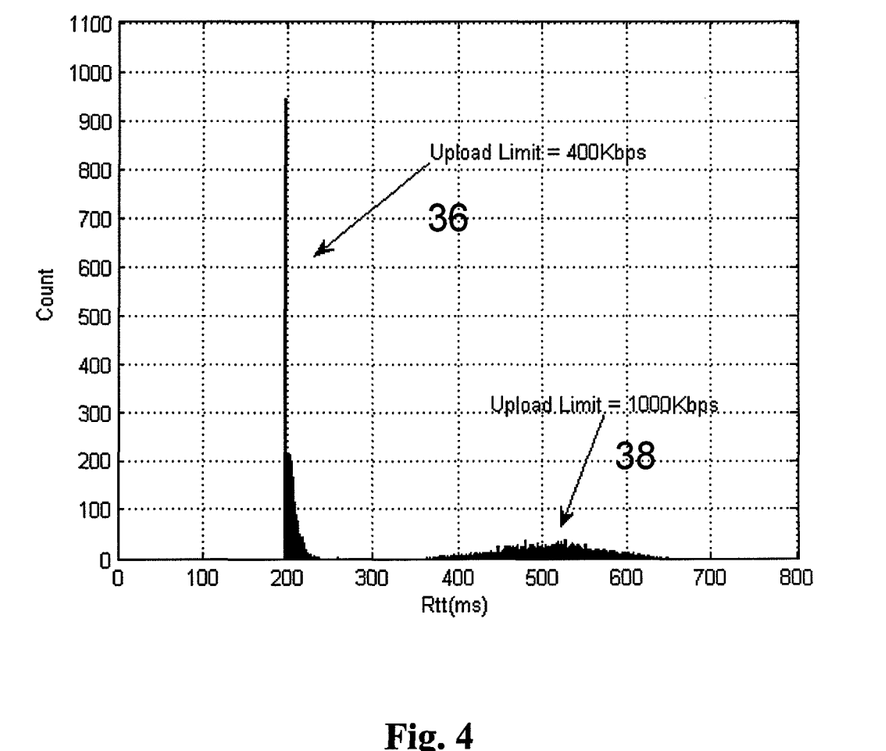
FIG. 4 is a histogram showing experimental measurements of RTT distributions when uplink data rate limit was set to 400 Kbps and 1000 Kbps, respectively.

Further experiments measured the RTT distributions when the uplink data rate limit was set to 400 Kbps and 1000 Kbps, respectively. RTT distribution histograms are shown in FIG. 4. With the low upload data rate limit of 400 Kbps, the RTT distribution 36 has a small mean value of 204 ms and a narrow distribution (STD=13 ms). It is also one-sided as the minimum RTT is bounded from below by the propagation delay.

By contrast, at the high upload data rate limit of 1000 Kbps the RTT distribution 38 has a significantly larger mean value (506 ms), and the standard deviation is far larger as well (65 ms). Comparing the two distributions suggests that it is possible to detect and distinguish them so that the application can automatically adjust the upload data rate limit to prevent congestion in the uplink.

REFERENCES

The following publications provide background for the present invention, as noted above and hereinafter:
[1] "ADSL overview", [Online]. Available: http://www.wowarea.com/dyn/vge.php/g__1/k__1/o__0 [Accessed: Apr. 25, 2009]
[2] "Azureus FAQ", May, 2008. [Online]. Available: http://wiki.vuze.com/index.php/Azureus_FAQ#Azureus_FAQ__.28Frequently_Asked_Questions.29. [Accessed Apr. 25, 2009]
[3] H. Balakrishnan, V. N. Padmanabhan and R. H. Katz, "The effects of asymmetry on TCP performance," in *Proceedings of the 3rd annual ACM/IEEE international conference on Mobile computing and networking*, p 77-89, September 1997.
[4] F. Louati, C. Barakat, and W. Dabbous, "Handling Two-Way TCP Traffic in Asymmetric Networks," HSNMC 2004, LNCS 3079, pp. 233-243, September 2004.
[5] W. Al-Khatib and K. Gunavathi, "A New Approach to Improve TCP Performance over Asymmetric Networks," *Electronics and Electrical Engineering*, No. 7(71), p. 13-18, 2006.
[6] Elloumi, H. Afifi, and M. Hamdi, "Improving Congestion Avoidance Algorithms for Asymmetric Networks," in *Proceedings of ICC'97*, Montreal, 1997, Vol. 3, pp. 1417-1421.
[7] H. Afifi, O. Elloumi and G. Rubino, "A Dynamic Delayed Acknowledgement Mechanism to Improve TCP Performance for Asymmetric Links," in *Proceedings of the Third IEEE Symposium on Computers and Communications*, 1998, pp. 188-192.
[8] C. Fu, L. C. Chung and S. C. Liew, "Performance Degradation of TCP Vegas in Asymmetric Networks and Its Remedies," in *Proceedings of the IEEE International Conference on Communications*, 2003, Vol. 7, pp. 42-44.
[9] V. Jacobson, R. Braden, D. Borman, "TCP Extensions for High Performance," *Request for Comments* 1323, May 1992.
[10] M. Carson and D. Santay, "NIST Net—A Linux-based Network Emulation Tool", *Computer Communication Review*, June 2003.
[11] M. Mathis, J. Semke, J. Mandavi, T. Ott. "The macroscopic behavior of the TCP Congestion Avoidance algorithm," *Computer Communications Review*, vol. 27, no. 3, p 67-82, July 1997.
[12] J. Padhye, V. Firoiu, D. Towsley, J. Kurose. "Modeling TCP throughput: a simple model and its empirical validation," in *Proceedings of the ACM SIGCOMM '98 conference on Applications, technologies, architectures, and protocols for computer communications*, p 303-314, September 1998.
[13] Mendenhall, R. Beaver, B. Beaver, *A Brief Introduction to Probability and Statistics*, Wadsworth Group, 2002.
[14] "ADSL Broadband Packages". [Online]. Available: http://www.promotion.hinetnet/adsl_hot__03.htm, [Accessed, Apr. 25, 2009]
[15] U. Lamping, R. Sharpe, and E. Warnicke, "Wireshark User's Guide". [Online]. Available: http://www.wireshark.org/docs/. [Accessed Apr. 25, 2009].

SUMMARY OF THE INVENTION

According to the invention, in a peer-to-peer asymmetric communication environment, an adaptive upload Data Rate Control element—called Adaptive-DRC-is used to detect increase in data return-trip time (RTT) caused by the congestion associated with the uploading of data in an uplink communication apparatus which in turn impacts on downloading data via an associated downlink communication apparatus, namely a downlink communication apparatus sharing resources with the uplink communication apparatus. Using Adaptive-DRC, the congestion is detected and thereupon adjustments to are made to allow continued communication. Adaptive-DRC operates according to an algorithm that comprises: (i) RTT estimation; (ii) detection of the onset of congestion, herein pre-congestion detection; and (iii) adaptation of the upload data rate limit. Two specific embodiments are contemplated, namely two versions of Adaptive-DRC wherein the difference lies in the upload data rate limit adaptation technique.

The Adaptive-DRC algorithms, while operative to change device functions, are intended for use at the application layer and thus can be readily deployed without the need to structurally modify network devices (as in network layer approaches) or operating systems (as in transport layer approaches).

The invention will be better understood by reference to the following detailed description in connection with the accompanying drawings

DETAILED DESCRIPTION OF THE INVENTION

FIG. 1 is an example of a bandwidth asymmetric network 10 with a plurality of Internet peers 12, 14, 16, including a peer ADSL user device 18 having been adapted according to the invention to employ an adaptive data rate control element 20. The peer ADSL user 18 as well as the other peer elements 12, 14, 16 may be home computers, mob-le devices, such as smart phones, laptop and notebook computers, and network-enabled keyboardless reading devices. In this example, the user device 18 is connected via an adaptive DSL link device through an adaptive DSL router 22 which communicates via shared bandwidth link comprising an uplink communication apparatus 24 and a downlink communication apparatus 26 to an Internet Service Provider (ISP) 28 to which the other peers 12, 14, and 16 are also linked. The adaptive DRC application ("app") 20 is the element incorporating the functions according to the invention operating on each local peer. The ISP encompasses all hardware and software to communicate with the peers, where some peers, such as peer ADSL user device 18 interface through an asymmetric router such as adaptive DSL router 22. While an ADSL network is a primary example of an asymmetric network, it is to be understood that the invention is not limited to ADSL environments. It is understood that the invention may operate in any network link environment, wired or wireless, that exhibits bandwidth asymmetry between the uplink side and the downlinkside. In particular this invention applies to the cases where the uplink side has less bandwidth than the downlink side. Some examples include but are not limited to: an ADSL modem link, a cable modem link, mobile networks such as 3G, HSPA, LTE, etc., and so on. The invention is also applicable to network links that have policy-based bandwidth asymmetry. In these networks, although the physical network does not exhibit bandwidth asymmetry, the network operator explicitly implements traffic throttling so that the resultant usable uplink bandwidth is reduced.

FIG. 2 is a graph that illustrates the so-called uplink bottleneck in a bandwidth-asymmetric network, namely the impact of upload rate on download rate. Download rates in this example drop dramatically after upload rates exceed about 60% of the network capacity, as for example at Point 30 upon exceeding a download rate of 600 KB/s of a bidirectional 1000 Kbs capacity system. It has been determined that by monitoring the RTT, the onset of such uplink congestion can be detected and a constraint on the upload data rate can be imposed to prevent congestion from occurring.

RTT Estimation

The first hurdle in RTT estimation is its need to be performed at the application layer. Although the TCP transport already has an estimation of RTT, it may not be possible for the application at the application layer to directly access it without modification of the underlying systems, which is undesirable and often not possible.

In case such access is not possible, the application of interest must implement its own RTT estimation. There are many ways to accomplish this and for simplicity in this embodiment of the implementation, the operating system's ping utility may be invoked to measure RTT to a selected external host.

Next a suitable external host device is needed to perform the measurement. This is not trivial in practice for two reasons. First, the external host device must not be located behind a firewall, such as a NAT firewall (which is a router or gateway in hardware or software form that makes the bridge between a local network and the Internet) as most such hosts ignore ping requests for security reasons. This can be challenging in a P2P network because it is common for many of the user devices to be located behind such NAT firewalls. Second, the external host device must be configured to respond to ping requests. Again due to security reasons most personal firewalls, many already built-in as part of the operating system, running in the user device's host block and ignore ping requests. This problem can also be solved by implementing RTT measurement within the application's own protocols.

Adopting the ping command as the RTT measurement tool and implementing RTT measurement into an application protocol frees the application layer from dependency on RTT measurements at the transport layer. The choice of external host system is that of a reliable domain that consistently responds to ping requests. A suitable host system has a fixed IP address resolved from the domain name "google.com", for example. Other external hosts may also be suitable.

It has been determined that download throughput loss is primarily due to the increased queuing delay in the uplink rather than due to packet losses. Thus by monitoring the RTT, a P2P application can detect the onset of uplink congestion and react by cutting down the upload data rate limit to prevent congestion from occurring.

Some P2P systems, such as Azureus, do not allow the Auto-Speed implementation to adapt to different network configurations and in many cases, underutilize the uplink bandwidth. This is undesirable, since the performance of a P2P system hinges on the amount of bandwidth its peers can contribute.

The inventive algorithm employed in the application of interest strikes a suitable balance between uplink utilization and downlink throughput performance. The following describes some of the features and elements of the algorithm.

Figure 7:
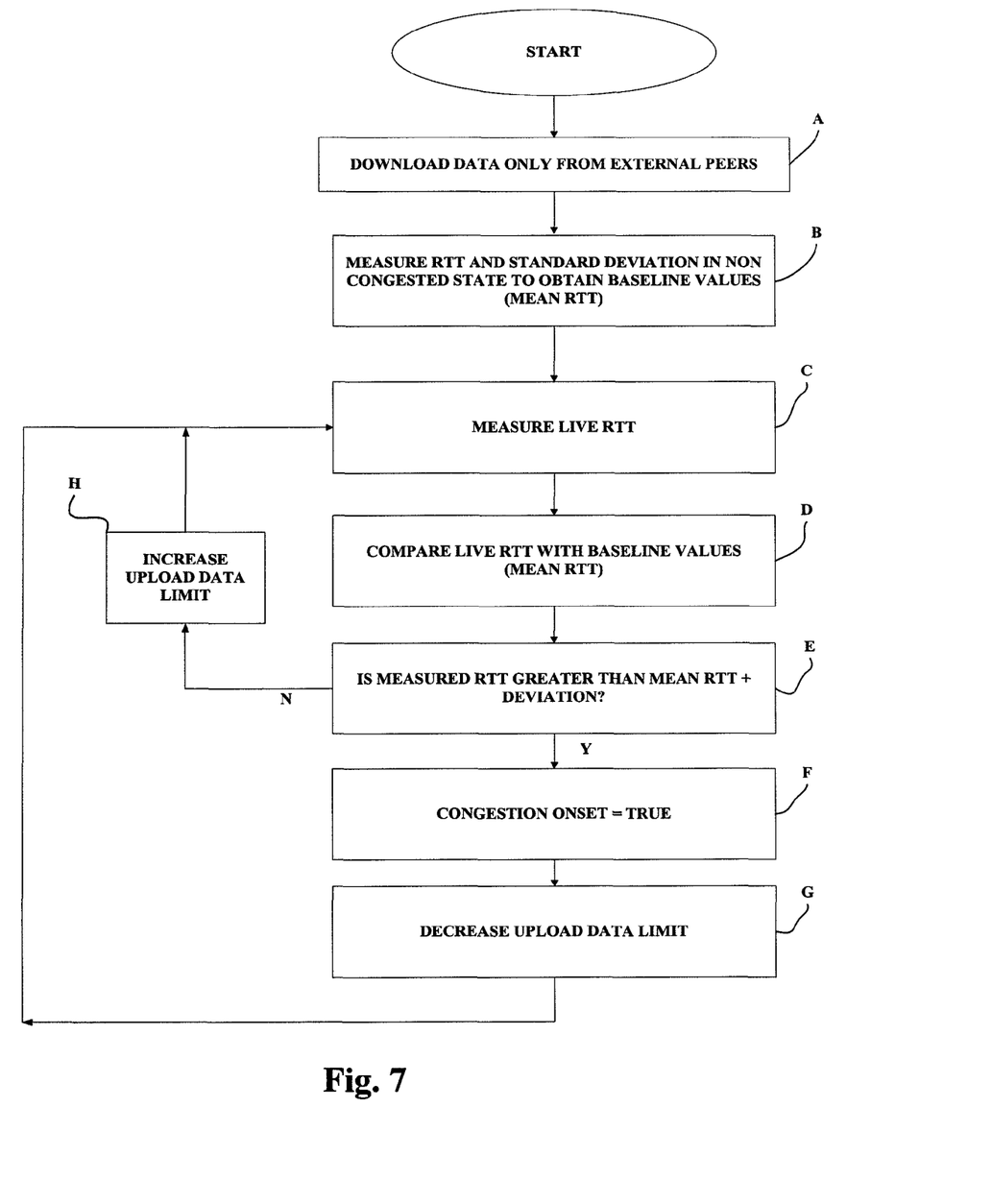
FIG. 7 is a flow chart of an automatic process of a system according to the invention.

FIG. 7 is a flow chart of the process according to the invention. This process is conventional instantiated in a computer program application having modules for executing each of the subprocesses. One of skill in the art can implement such modules by reference to the following description. At the outset is pre-congestion detection. Pre-congestion detection is divided into two phases: initialization and monitoring. During initialization when the P2P application is first started, the application only allows data to be downloaded from external peers so that the uplink will not be congested by upload traffic (Step A). The application then calibrates the network by conducting RTT measurements to compute the mean RTT and its standard deviation when the uplink is in non-congested state (Step B). These statistics then serve as the baseline for comparisons made in the monitoring phase.

In the monitoring phase the application carries out live RTT measurements periodically (Step C) and compares the newly measured RTT against the baseline values (Step D) to determine if the uplink is developing the onset of congestion, in which case the measured RTT is expected to increase. To compensate for the inherent variations in RTT measurements, a threshold above the mean RTT is established to serve as the detection criterion (Step E). The threshold is determined as follows:

Let d be the newly measured RTT. Then according to the Chebychev's inequality [13]:

$$Pr(|X - \mu| \geq k\sigma) \leq \frac{1}{k^2} \qquad (1)$$

where μ and σ are the mean and standard deviation of the RTT respectively, which can be estimated from the measurements during the initialization phase. By choosing an appropriate value for k, the probability of false positive can be controlled to within $1/k^2$, i.e., ≦1% for k=10.

Upload Data Rate Limit Adaptation

Upon identification of the onset of data congestion (Step F), the application adjusts the upload data rate limit according to the result from pre-congestion detection. The principle is to increase the upload data rate limit when the uplink is not congested (Step G) and to decrease the upload data rate limit at the onset of detectable congestion (Step H).

Figure 8:
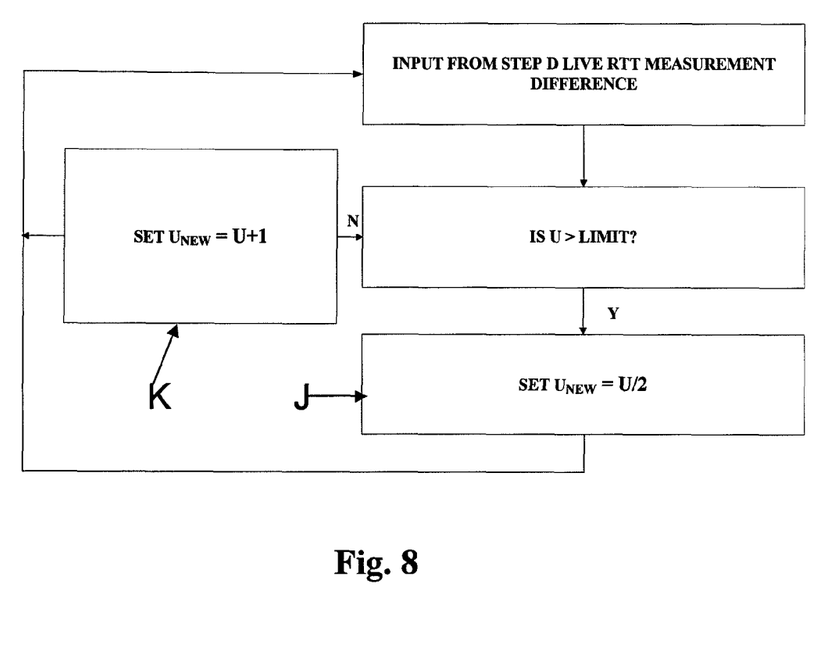
FIG. 8 is a flow chart for a first method for adjusting upload data rate limit.
Figure 9:
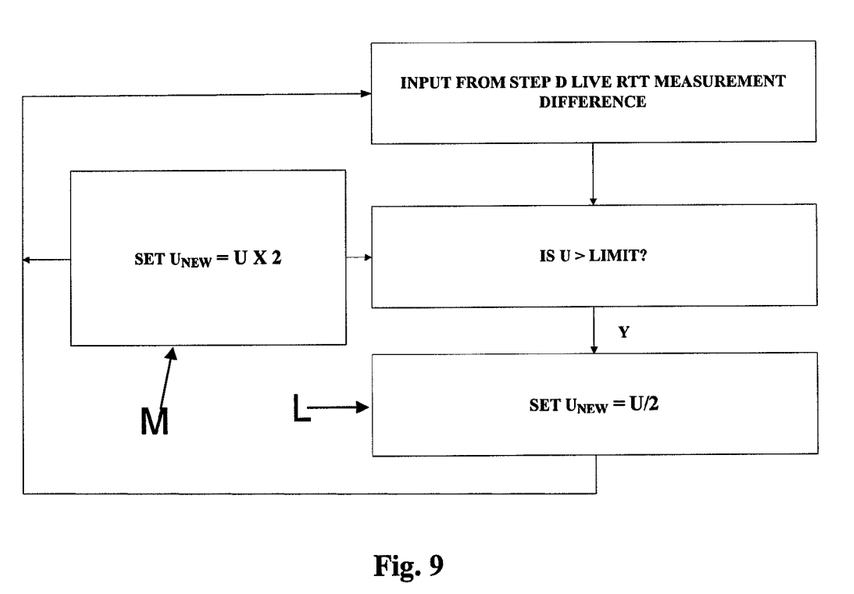
FIG. 9 is a flow chart for a second method for adjusting upload data rate limit.

According to the invention, there are two versions of an adaptive data rate limit algorithm. In FIG. 8, the first is based on Additive-Increase, Multiplicative-Decrease (AIMD) as in TCP protocol's congestion control algorithm. In FIG. 9, the second is based on Multiplicative-Increase Multiplicative-Decrease (MIMD).

Specifically, after each periodic RTT measurement d conducted in the monitoring phase, the upload data rate limit is adjusted according to:

$$U_{new} = \begin{cases} U/2, & \text{if } (d-\mu) > k\sigma \\ U+1, & \text{if } (d-\mu) <= k\sigma \end{cases} \quad (2)$$

(as in Steps J and K) for the AIMD version (FIG. 8) and $$U_{new} = \begin{cases} U/2, & \text{if } (d-\mu) > k\sigma \\ U \times 2, & \text{if } (d-\mu) <= k\sigma \end{cases} \quad (3)$$

(as in Steps L and M) for the MIMD case (FIG. 9). In both cases $U_{new}$ is the new upload data rate limit and U is the current upload throughput or upload data rate as measured internally, d is the live return trip time, $\mu$ is the mean return trip time, and $\sigma$ is deviation. In a particular embodiment, the running average of the upload rate is over the past 3 seconds.

Experimental Verification and Performance Evaluation of Adaptive-DRC Algorithms

As evidence of the effectiveness of the Adaptive-DRC algorithms, the performance of was evaluated in the context of BitTorrent using Azureus Version 3.0 as the implementation. Experiments were conducted in a controlled network as depicted in FIG. 1 above. Experiments were for eight-asymmetric network configurations listed in Table 1, which represent the commonly deployed ADSL broadband services in the industry, as cited above in [14].

TABLE I

Asymmetric network configurations

| Network Configurations | Downlink Bandwidth | Uplink Bandwidth |
|---|---|---|
| 1 | 256 Kbps | 64 Kbps |
| 2 | 1 Mbps | 64 Kbps |
| 3 | 2 Mbps | 256 Kbps |
| 4 | 2 Mbps | 512 Kbps |
| 5 | 4 Mbps | 1 Mbps |
| 6 | 8 Mbps | 640 Kbps |
| 7 | 8 Mbps | 1 Mbps |
| 8 | 12 Mbps | 1 Mbps |

All hosts ran the Windows XP operating system with default installation settings. The host machines were verified to be able to saturate the downlink and uplink so that the hosts will not be the bottleneck in the experiments. The experiments were conducted using the NISTnet (see [10] above) emulator to emulate bandwidth asymmetry in the access network. All peers in the system ran the Azureus P2P application. The system was set up so that the peer behind the access network—ADSL user, shared files through BT protocol with the external peer in the external network. For the experiment there was no limit on the upload data rate of the external peer so that the download throughput was not limited by the external peer. During the experiment, the upload limit of ADSL use was gradually increased every 10 seconds until it reached the uplink capacity. There was no other competing traffic going through the link.

Figure 5:
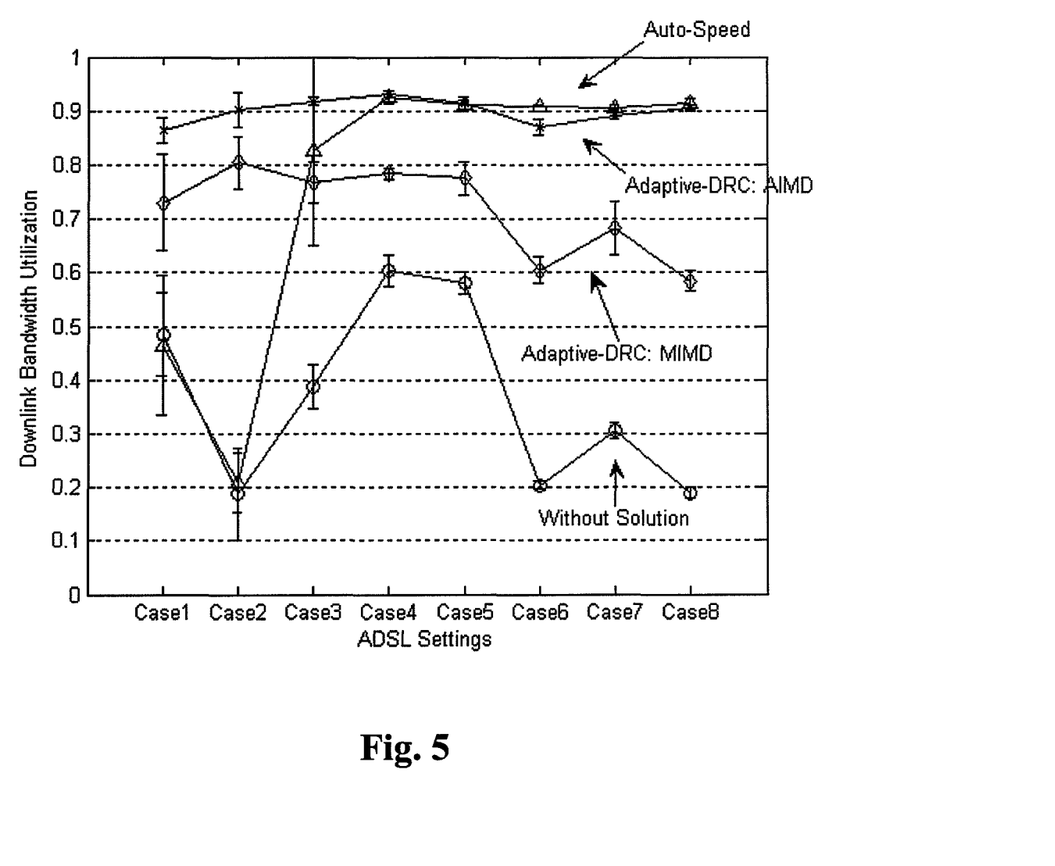
FIG. 5 is a graph illustrating different downlink bandwidth utilizations.

The network traffic was captured using Wireshark (see [15] above) and the download and upload throughputs were calculated from the packet trace files. Referring to FIG. 5, Each experiment run lasted for 5 minutes and a separate set of experiments was conducted for the following four scenarios on an ADSL user host: (i) no upload limit 40; (ii) Auto-Speed; (iii) Adaptive-DRC: AIMD; and (iv) Adaptive-DRC: MIMD In scenario (i) there was no limit on the upload data rate and TCP control set the data rate via its built-in congestion-control algorithm. In scenario (ii) an Auto-Speed feature in Azureus was enabled to control the upload data rate limit. In scenario (iii) and (iv), the Adaptive-DRC AIMD version and MIMD version of the invention were respectively implemented.

Link utilization is defined to be the ratio between actual throughput achieved and the link bandwidth available. For example, a download throughput of 500 Kbps over a downlink of 1 Mbps will give a link utilization of 500K/1M=0.5.

Comparing the link utilization for the downlink in FIG. 5 for the eight network configurations listed in Table 1 shows that without any upload limit, the download throughput suffered significantly as expected. The extent of degradation is correlated to the downlink-to-uplink bandwidth ratio. For example, the poorer performing configures (network configurations 2, 3, 6, 7, 8) have larger downlink-to-uplink bandwidth ratios (with ratios of: 16, 8, 13, 8, 12) than the better performing ones (at a ratio of four for network configurations 1, 4, and 5). This can be explained by the observation that the amount of TCP ACKs generated on uplink is proportional to the download throughput. Thus smaller downlink-to-uplink bandwidth ratio will have relatively more uplink bandwidth for the upstream TCP ACK traffic.

Second, the performance of Auto-Speed is not consistent across the eight-network configurations. It performed best in the higher bandwidth configurations (4~8) but in configurations 1 and 2 it had nearly the lowest downlink utilization of all four scenarios.

Figure 6:
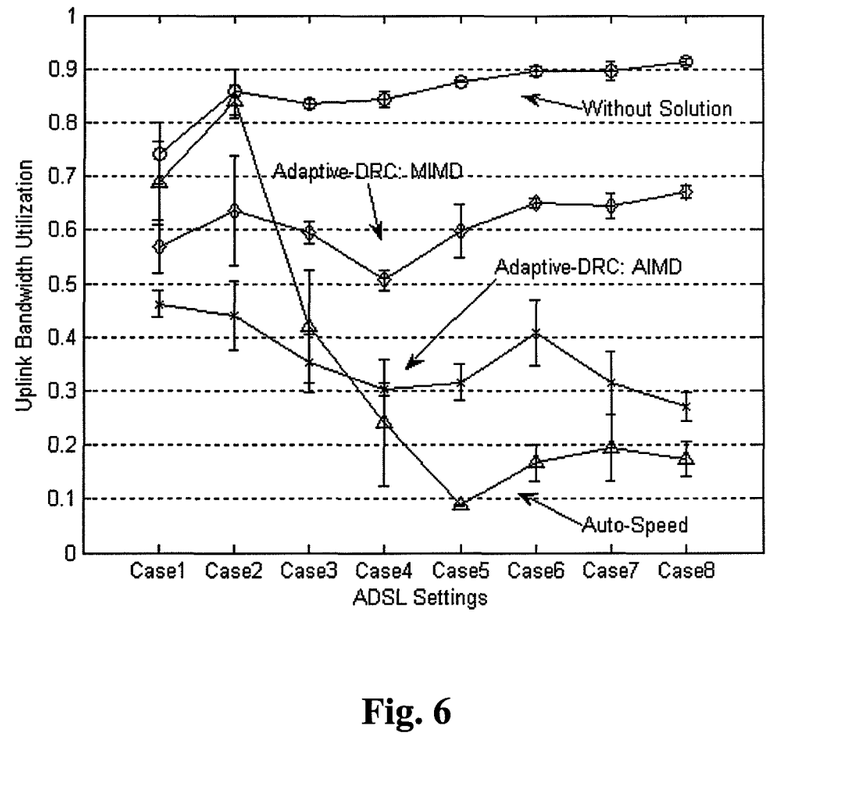
FIG. 6 is a graph illustrating different uplink bandwidth utilizations.

Moreover, if considering also the uplink utilization in FIG. 6 then the reason for the observed results can be seen, namely, the Auto-Speed algorithm turned out to be too aggressive in the uplink for network configurations 1 and 2 but too conservative for network configurations 4~8, resulting in uplink utilization lower than 0.3.

The performance of the Adaptive-DRC algorithm was confirmed to be substantially more consistent by comparison. The AIMD version achieved downlink utilization above 0.8 and uplink utilization varied between 0.28 and 0.5. The MIMD version achieved the downlink and uplink utilizations within 0.58 to 0.8, and 0.5 to 0.67 across the eight-network configurations. Generally speaking AIMD is more conservative in utilizing the uplink (thus leading to higher downlink throughput) while MIMD can achieve higher uplink utilization (with slightly lower downlink throughput). More importantly, both Adaptive-DRC algorithms perform consistently across all eight-network configurations and thus can reliably strike a balance between uplink and downlink utilizations without the need for human intervention.

VI. CONCLUSION

The performance of P2P applications in asymmetric network environments is severely constrained without proper control of upload data rate, since the download throughput will be adversely affected due to significantly increased queuing delay in the uplink carrying uploading data. According to the invention, this problem is resolved by a method employing adaptive—Data Rate Control (DRC) algorithms implemented entirely within the application layer so that the method can be readily incorporated into existing P2P applications without need to modify operating systems or network routers.

The invention has been explained with reference to specific embodiments. Other embodiments will be evident to those of ordinary skill in the relevant art. It is therefore intended that the invention not be limited, except and indicated by the appended claims.

What is claimed is:

1. In a peer-to-peer asymmetric communication environment in which a downlink communication apparatus shares resources with an uplink communication apparatus, a method for detecting and compensating for congestion comprising:
establishing a congestion onset threshold according to data return-trip time (RTT) measured via an application layer in the communication environment;
detecting, via the application layer, increase in data return-trip time (RTT) of live data in the uplink communication apparatus, said increase being caused by onset of congestion associated with uploading of data via the uplink communication apparatus; and
making adjustments to upload data rate limit to promote continued communication via the uplink communication apparatus in order to compensate for contention among said resources between return traffic of a downlink flow and an uplink data flow in a shared network uplink.

2. In a peer-to-peer asymmetric communication environment having shared bandwidth between uplink apparatus and downlink apparatus and having an application layer operative independent of a transport layer and a network layer, a method for adaptively changing upload data rate of the uplink comprising:
measuring live return trip time in the application layer;
comparing live return trip time with a mean return trip time;
if the measured live return trip time is greater than the mean return trip time plus a deviation value, then decreasing upload data limit; and
if the measured live return trip time is less than the mean return trip time plus a deviation value, then increasing upload data limit,
in order to optimize shared bandwidth utilization and minimize congestion caused by contention among resources using said shared bandwidth.

3. The method according to claim 2 wherein the increasing step is additive.

4. The method according to claim 3 wherein the decreasing step is multiplicative.

5. The method according to claim 2 wherein the upload data rate is selected to be $$U_{new} = \begin{cases} U/2, \text{ if } (d-\mu) > k\sigma \\ U+1, \text{ if } (d-\mu) <= k\sigma \end{cases}$$

where U is the upload data limit, d is the live return trip time, $\mu$ is the mean return trip time, and $\sigma$ is deviation.

6. The method according to claim 2 wherein the upload data rate is selected to be $$U_{new} = \begin{cases} U/2, \text{ if } (d-\mu) > k\sigma \\ U \times 2, \text{ if } (d-\mu) <= k\sigma \end{cases}$$

where U is the upload data limit, d is the live return trip time, $\mu$ is the mean return trip time, and $\sigma$ is deviation.

7. The method according to claim 2 wherein the increasing step is multiplicative.

8. The method according to claim 7 wherein the decreasing step is multiplicative.

9. The method according to claim 2 wherein the decreasing step is multiplicative.

10. A data rate control system in a peer-to-peer asymmetric communication environment in which a downlink communication apparatus shares resources with an uplink communication apparatus, the data rate control system comprising:
a first detector for establishing a congestion onset threshold according to data return-trip time (RTT) measured via an application layer;
a second detector for detecting via the application layer increase in data return-trip time (RTT) in live data as caused by onset of congestion associated with uploading of data in the uplink; and
a data rate control element responsive to the first detector and the second detector for making adjustments to upload data rate limit to allow continued communication in order to compensate for congestion caused by contention among resources using said shared bandwidth.

11. A system for adaptively changing upload data rate of an uplink communication apparatus in a peer-to-peer asymmetric communication environment having shared bandwidth between uplink apparatus and downlink apparatus and having an application layer operative independent of a transport layer and a network layer, the system comprising:
a module for measuring live return trip time in the application layer;
a module for comparing live return trip time with a mean return trip time;
a module for deciding if the measured live return trip time is greater than the mean return trip time plus a deviation value, then decreasing upload data limit; and
a module for deciding if the measured live return trip time is less than the mean return trip time plus a deviation value, then increasing upload data limit,
in order to optimize shared bandwidth utilization and minimize congestion caused by contention among resources using said shared bandwidth.

12. The system according to claim 11 wherein the upload data rate is selected to be $$U_{new} = \begin{cases} U/2, \text{ if } (d-\mu) > k\sigma \\ U+1, \text{ if } (d-\mu) <= k\sigma \end{cases}$$

where U is the upload data limit, d is the live return trip time, $\mu$ is the mean return trip time, and $\sigma$ is deviation.

13. The system according to claim 11 wherein the upload data rate is selected to be $$U_{new} = \begin{cases} U/2, \text{ if } (d-\mu) > k\sigma \\ U \times 2, \text{ if } (d-\mu) <= k\sigma \end{cases}$$

where U is the upload data limit, d is the live return trip time, $\mu$ is the mean return trip time, and $\sigma$ is deviation.

* * * * *